May 23, 1933.   D. H. REED   1,910,637
OUTSIDE PIPE CUTTER
Filed Oct. 18, 1929   2 Sheets-Sheet 1

DEMPSON H. REED.
INVENTOR
BY Jesse R. Stone
ATTORNEY

May 23, 1933.  D. H. REED  1,910,637
OUTSIDE PIPE CUTTER
Filed Oct. 18, 1929  2 Sheets-Sheet 2

DEMPSON H. REED.
INVENTOR
BY Jesse R. Stone
ATTORNEY

Patented May 23, 1933

1,910,637

UNITED STATES PATENT OFFICE

DEMPSON H. REED, OF HOUSTON, TEXAS, ASSIGNOR OF ONE-HALF TO JAMES S. ABERCROMBIE, OF HOUSTON, TEXAS

OUTSIDE PIPE CUTTER

Application filed October 18, 1929. Serial No. 400,602.

The invention relates to pipe cutters for cutting pipe in wells and is more specifically a cutter of this character adapted to cut the pipe from the outside and is in the nature of an improvement over my co-pending application, Serial No. 332,003, filed January 12, 1929.

In well drilling operations it often occurs that the drill stem or a casing of small diameter will become broken or twisted off so that a portion thereof remains in the well. When this occurs the flushing fluid, which is present in the well during the drilling operation, may congeal, or the walls of the well bore may cave in in such a manner that the removal of the casing remaining in the well can not be accomplished. The present tool is of the type which has been devised to remove these pieces of drill stem or casing from the well by telescoping the tool over the outside of the junked pipe and severing the uppermost section therefrom. This operation may be repeated until all of the pipe or casing has been removed and the well drilling operation may then proceed or the well abandoned.

Devices of this character have been previously devised but in most of them it is difficult if not impossible to release the pipe engaged by the cutter where it is found that it can not be removed after the pipe has been severed or it is impossible to complete the cut.

It is an object of the invention to provide an outside pipe cutter which is capable of engaging over the pipe in the well and to release such engagement if the cut can not be completed.

Another object of the invention is to devise a pipe cutter wherein engagement is had with the pipe to be cut by means of dogs beneath a collar upon the pipe in such a manner that subsequent rotation of the cutter body will sever the pipe below the collar which is being engaged.

Another object of the invention is to devise a pipe cutter which will have a positive cutting action, depending upon the amount of rotation of the cutter body.

A still further object of the invention is to devise a pipe cutter wherein the cutting action of the blades is caused by an advancing wedge which is driven by a screw thread from the cutter body.

A still further object of the invention is to devise the cutting blades in such a manner that the amount of cutting action can be determined by the number of rotations of the cutter body.

Another object of the invention is to devise a mechanism which will permit the cutting blades to rotate but will cause a wedge to be passed behind the cutter blades in order to extend them against the pipe being cut.

Other and further objects of the invention will be readily apparent such as the simplicity of the device and the practical embodiments which are illustrated.

The invention will be readily understood when the following description is considered in connection with the accompanying drawings wherein Fig. 1 is a central vertical section showing the pipe cutter body and parts thereof in section and with the junked pipe in elevation but having certain parts thereof broken away for purposes of illustration.

The piece of pipe or drill stem which has been junked in the well is indicated generally at 1. This is in most instances a piece of drill stem which has been twisted off due to excessive torque during the drilling operation or it may be a piece of casing which has become lodged in the well bore. With tools of the type here disclosed the tool is connected to a string of pipe or casing such as 2, which is of greater internal diameter than the outside diameter of the piece of pipe which is to be recovered. The tool is then lowered into the well bore in such a manner that it will be telescoped over a piece of junked pipe. To accomplish this, various types of shoes have been devised and such shoes are connected upon the pipe 3, which is shown in the lower end of Fig. 2.

Figure 1:
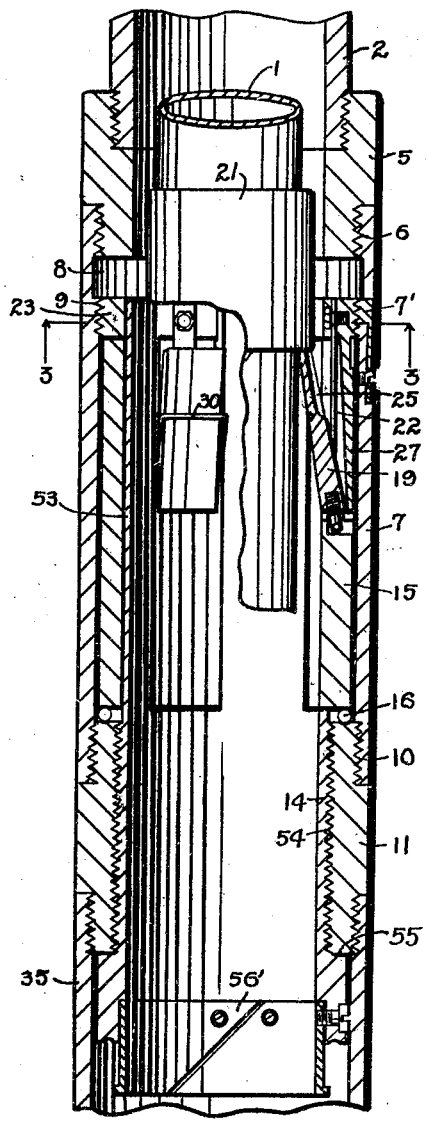

The pipe cutter comprises a body portion which includes a coupling 5 connected to the pipe 2 and having its lower end externally threaded at 6 to receive the housing 7. This housing is shown as having an annular cut-out portion 8 and being threaded at 9. The lower end of this housing is threaded at 10 to a second coupling or fitting 11. The fitting 11 is threaded on its inner face to receive the driving wedge or chuck 14. Inside of the housing 7 is a sleeve 15 arranged for rotation by means of the anti-friction bearings 16 upon the top of the flat upper surface of the fitting 11. This sleeve 15 is seen in side elevation in Fig. 5 and has a plurality of cut-out portions 18, each of which is adapted to receive one of the dogs 19. These dogs are shown as pivoted at 20 for swinging movement in order that they may engage under the collar 21 of the junked pipe. Fig. 1 shows these dogs in collar-engaging position. Above the upper end of the sleeve 15 is arranged a ring 23 which carries a small leaf spring 22 which projects downwardly and behind the dog 19. In this manner the spring 22 will constantly urge the dogs inwardly so that they will click under the collar as soon as the dog has been lowered beyond the underside thereof. The upper portion of each of the dogs, however, is shown as cut away at 25 in order that the spring 22 may be received in this opening when the dog is thrown rearwardly in a manner which will be later described. The ring 23 is threaded to the housing 7 at 9 and is of such a width that it may screw upwardly and be received within the cavity 8. This occurs when the tool has been lowered into the well and raised upwardly so that the dogs 19 engage beneath the collar of the junked pipe. Subsequent rotation of the cutter tool will cause the ring 23 to unscrew from the threads 9 and move upwardly, due to the fact that the dogs 19 are held stationary, as is the sleeve 15. A small segment 7' is shown in Fig. 1 as having been cut from the housing 7 and mounted so that it will spring inwardly after the ring 23 moves upward and thus prevent its return as will be later described.

Figure 5:
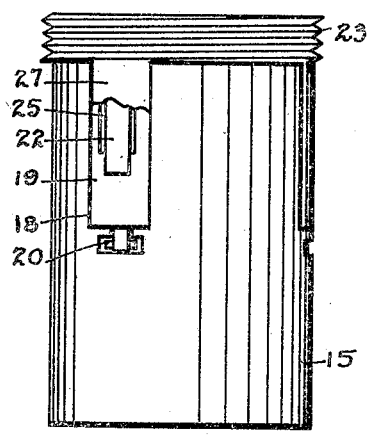
Fig. 5 is a side elevation of the dog supporting collar.

Fig. 5 shows the sleeve 15 having the slots or openings 18 cut downwardly from the top. As previously described, these openings are adapted to contain the dogs 19 but also receive a thin finger 27, which is a part of the ring 23. This finger tends to fill the back portion of the opening 18 and prevent the dogs from falling outwardly or being displaced. A rat-trap spring 30 is arranged upon the sleeve 15 in a manner to normally urge the dogs from beneath the collar of the junked pipe. This spring 30, however, is of less strength than the leaf spring 22 so that as the tool is being lowered into the well the spring 22 will force the dogs into extended position so that they will immediately click beneath a collar on the junked pipe. However, after the tool has been rotated and the ring 23 raised into the groove 8, the leaf springs 22 will also have been raised to a point where they will fit into the cavity 25, which will materially reduce the spring tension upon the dogs 19. It is intended, however, that during this time the dogs will be retained in extended position by their enegagement with the collar of the junked pipe so that it may be raised from the well when the cut has been completed. However, in event the pipe can not be severed or can not be removed and it is desired to release the dogs after the tool has been rotated it is only necessary to slack off on the hoisting cable so as to lower the tool. This will free the dogs from engagement with the collar and the rat-trap spring 30 will then swing the dogs back to a substantially vertical position so that the tool may be withdrawn from the well. When the tool is again to be used it is only necessary to reset the ring 23 in proper position so that the leaf springs 22 will cause the dogs 19 to be extended.

Figure 2:
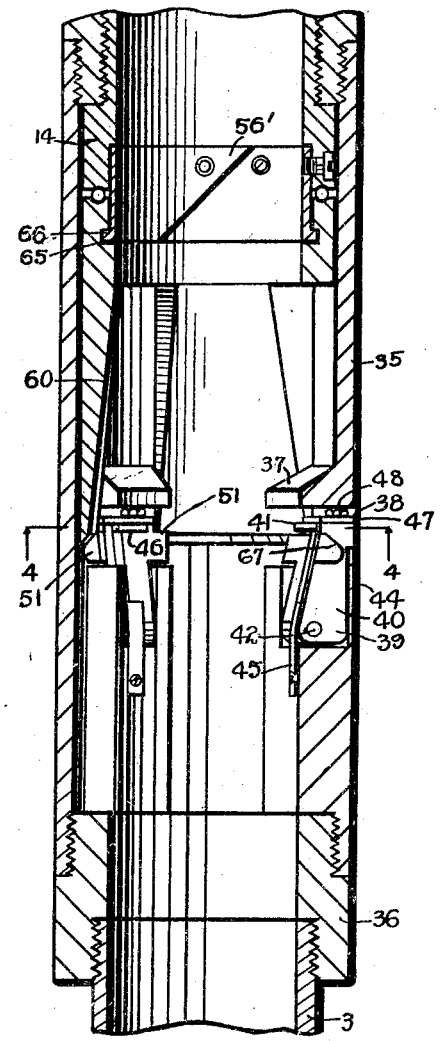
Fig. 2 is a view similar to Fig. 1 but showing the lower end of the tool illustrated in Fig. 1, Figs. 1 and 2 being a complete showing of the tool.
Figure 3:
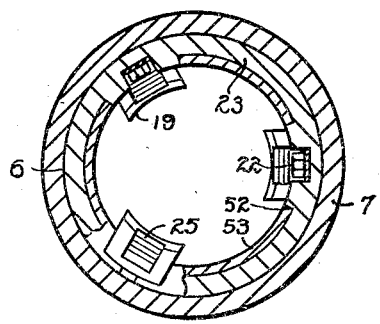
Fig. 3 is a central transverse section taken on the line 3—3 of Fig. 1.

The arrangement of the cutters is best seen in Fig. 2 and they are arranged within a cutter housing 35, which is connected to the fitting 11. This housing is cylindrical in formation and is arranged to receive a lower or shoe coupling 36, which carries the pipe or shoe 3. This cutter housing is provided with a plurality of projecting lugs 37, each of which surmounts a cavity 38 in which the cutter 39 is adapted to be pivoted. It will be noted that the housing 35 is directly connected to the pipe 2 so that it may be positively rotated as desired. In order to provide a simple and economical cutter which may be readily replaced when it becomes worn or broken I have divided the cutter into two portions which include the cutter body 40 and the cutter blade 41. The body 40 is shown as pivoted at 42 to the cutter housing 35 and is arranged for inward swinging movement but is limited in its outward movement by the rim 44, which is upstanding on the cutter housing. A spring 45 fastened on the inner face of the housing 35 below the opening 38 retains the cutter body in retracted position. In order that the cutters may be economically produced I have provided the upper face of the cutter body 40 with a dovetailed groove 46, into which the blade 41 may be moved longitudinally. A cap plate 47 is arranged to overlie the cutter plate and retain it in position, a cap screw 48 being provided to securely fasten both the cap 47 and the cutter blade 41 to the body 40.

Figure 4:
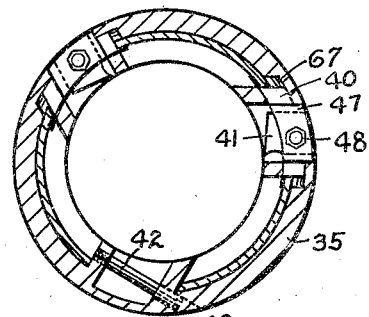
Fig. 4 is a section taken on the line 4—4 of Fig. 2.

The structure just described is best illustrated in top plan view in Fig. 4. The pivot pin 42 is so arranged that it may be removed through the passage 49 by means of a small screw driver or other instrument so that the body may be readily removed in order to replace the cutter. It will also be noted that while the cutter is in the position shown in Fig. 2 it is impossible for the cap screw 48 to become dislodged and the cutter displaced, due to the fact that the cap screw when it becomes loosened would engage against the lug 37. The lugs 37 prevent injury to the cutting blade and body while the tool is being lowered into and removed from the well bore. The rear face of each of the cutter bodies is arranged to abut against the rim 44 so that they will not be forced outwardly beyond the periphery of the housing 35 by the spring 45. The body 40 is also provided on each side with outstanding ears 51, the rear faces of which are beveled downwardly for a purpose which will be later described.

Figure 6:
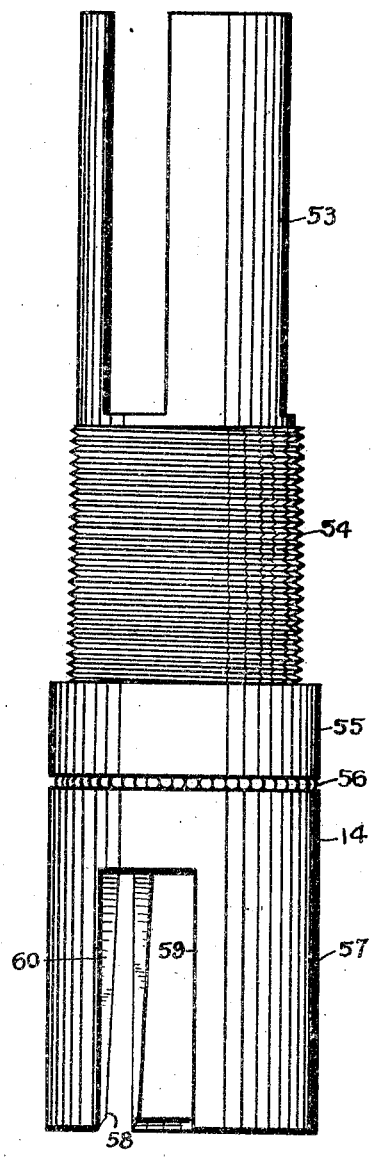
Fig. 6 is a view of the mandrel used to extend the cutter.

The mechanism for extending the cutters into operating position comprises the mandrel or chuck 14. This chuck is best seen in side elevation in Fig. 6 and comprises a plurality of upstanding arms 53, which are adapted to interfit about the dogs 19 within the sleeve 15 and ring 23. These arms are arranged to slide in grooves 52 which are cut radially and are therefore dovetailed in section so that the arms can not be removed except by sliding longitudinally. Thus when the dogs 19 engage beneath the collar 21 of the junked pipe they are prevented from rotation. The arms 53 will also be prevented from rotation. Below the arms 53 the mandrel 14 is threaded at 54. The length of this threaded portion may be varied, depending upon the amount which the cutting blades are to be extended and the threads may also vary as to pitch, depending upon the speed of travel of the mandrel 14 which it is desired to obtain.

The threads 54, as will be noted in Fig. 1, are arranged to engage with the threads on the inner face of the coupling or fitting 11. Below the threads 54 the mandrel 14 is enlarged at 55 to be received beneath the lower shoulder of coupling 11. An anti-friction bearing race 56 is provided between the enlarged portion 55 of the mandrel and the wedge collar 57. A split ring 56' is fitted within the mandrel 14 and held in position so that it will prevent entrance of dirt or obstructions above the collar 57 and into the anti-friction bearing 56. This ring 56' serves to prevent longitudinal movement between the portion 55 and the collar 57 but permits the rotation of the collar. The collar 57 is best seen in Fig. 2 and is arranged within the cutter housing 35 directly above the cutting blades. The wedge collar, however, is forked or tined at 58 so that a plurality of slots 59 are formed. These slots are of sufficient width to receive the lugs 37 and also the body portion 40 of the cutter body. The ears 51 of the cutter body, however, are of greater width than the openings or slots 59 so that as the mandrel is lowered the tapered or wedge-shaped face 60 of each of the tines are engaged behind the tapered face 67 of the ears 51. It will be readily apparent that as the mandrel 14 is lowered the tapered face 60 will gradually move the cutter body and the cutter blade 41 inwardly toward the pipe to be severed. Each of the cutters will be driven on opposite sides by a separate tine or wedge of the mandrel, so that there will be no failure in any of the cutting blades. The cutting blade may be made of any desired material but I have shown them in plan view in Fig. 4 as being similar to the usual cutting blade in lathe tools and I find that such construction is very economical as a supply of these blades may be carried on hand, and inasmuch as they are very small the cost is therefore proportionate.

The operation of the device is as follows: The tool is lowered into the well until the junked pipe is encountered. It may then be rotated so that the shoe on the lower end of the pipe 3 will remove any accumulation of debris of material about the pipe. In this manner the tool is lowered about the junked pipe a sufficient distance until it is desired to make a cut. During this lowering operation the dogs 19 have clicked past each of the collars on the junked pipe so that it is only necessary that the tool be raised until the dogs engage beneath the collar which has just been passed. When this occurs a tension is maintained upon the pipe 2 so that the dogs will be firmly engaged beneath the collar 21. The tool is then rotated, preferably in a right-hand direction. This rotation unscrews the ring 23 so that the wings 27 and the springs 22 are withdrawn from in the rear of the dogs 19. This relative movement due to the unscrewing of the threads 9 is accomplished due to the fact that the sleeve 15 is mounted upon the anti-friction bearings 16 and may therefore remain stationary while the housing 7 is rotated. During this same rotation the mandrel 14 will be held stationary due to the fact that the arms 53 are engaged within the slots 52. As the housings 7 and 35 are rotated by the pipe 2 the mandrel 14 will remain stationary and the threads 54 will unscrew from the coupling 11. This unscrewing action will move the mandrel or chuck 14 downwardly with respect to the cutters 39. This downward movement will cause the wedge collar 57 to force the points of the prongs behind the ears 51 of the cutting bodies.

The collar 57, however, is permitted to rotate with the cutter housing 35 and the cutters by means of the anti-friction bearings 56. In this manner the cutting blades 41 will be positively driven into engagement with the pipe to be cut. The amount of inward movement of the cutters, however, can be positively controlled by the number of rotations of the pipe 2 and it seems apparent that by varying the pitch of the threads 54 the speed of inward movement of the cutters may be varied to accommodate any existing conditions and to obtain a cut in any desired number of revolutions. The length of the threads 54 may be increased so that a sufficient number of revolutions may be obtained in order to accomplish a cut where an extraordinary thick-pipe is encountered. The advantages of the driving mechanism for the cutting blades will be readily apparent as the amount of inward movement is directly proportionate to the number of rotations of the pipe. The cutting action is positive at all times and is not dependent upon fluid pressure or other uncertain factors. The cutting blades may be readily removed and in view of the fact that three cutting blades are provided which are of the same type which are usually employed in lathes it is possible to obtain a cut on a pipe in a well bore in practically the same time that a similar cut could be made under ideal conditions in a machine shop lathe.

In event the pipe which has been severed cannot be removed, or the cut cannot be completed or for some reason it is desired to retract the cutters so that the tool may be removed it is only necessary to reverse the direction of rotation of the tool. When this occurs the dogs 19 will remain in engagement with the collar 21 and the threads 54 will move upwardly with respect to the coupling 11 will raise the wedge members 57 and allow the springs 45 to retract the cutters. The wedge members are raised by the rings 56', which has an enlarged flange or ring 66 upon its lower end. This rim fits into the groove 65 in the wedge collar 57 so that it may exert an upward pull upon the wedge members. During this reverse rotation the segment 7' has prevented the ring 23 from threading back into the housing 7 and when the cutters are retracted and the tension on the tool relieved, then the springs 30 will move the dogs 19 from beneath the collar 21.

Various alterations and modifications may be made in the device without departing from the spirit of the invention as set forth in the appended claims.

Having thus described my invention, what I claim as new and desire to protect by Letters Patent is:

1. An outside pipe cutter including in combination a cutter body, a plurality of radially movable cutters therein, a wedge-shaped mandrel arranged to be moved between and to rotate with said cutters and said body whereby said cutters will be moved inwardly, driving means for said mandrel including means adapted to engage the pipe being cut and held non-rotatable thereby, and means engaging the cutter body whereby said mandrel will be moved longitudinally upon rotation of said housing.

2. An outside pipe cutter including in combination a cutter body, a plurality of radially movable cutters therein, a forked wedge-shaped mandrel arranged to be moved between and to rotate with said cutters and said body whereby said cutters will be moved inwardly, and driving means for said mandrel including means adapted to engage the pipe being cut and held non-rotatable thereby and means engaging the cutter housing whereby said mandrel will be moved longitudinally upon rotation of said housing, the movement of said last means being directly proportional to the amount of rotation.

3. A pipe cutter having cutting blades adapted to be moved inwardly to cutting position directly in proportion to the amount of rotation of the cutter, and including a forked wedge-shaped mandrel disposed so that it will straddle the cutting blades.

4. A pipe cutting tool having cutting blades adapted to be moved inwardly to cutting position directly in proportion to the amount of rotation of the cutter, whereby the depth of the cut may be known to the operator and including a set of dogs to engage the pipe to be cut, means to normally hold said dogs inwardly but displaceable upon rotation of the tool, and additional means to retract said dogs upon their movement away from the pipe being cut.

5. A positive drive outside pipe cutter, cutting blades carried by said cutter, means whereby each rotation of the cutter tool advances the cutter blades a predetermined amount, and means projecting over each of said cutting blades to protect the same while the cutter tool is being inserted or removed from the well bore.

6. A pipe cutter adapted for use in cutting pipes in well bores wherein the cutter tool body is telescoped over the pipe to be cut, said cutter having movable cutting blades, means to move said blades a predetermined distance for each revolution of the cutter and to fix the elevation of the tool with respect to the pipe, said means including dogs to engage the junk pipe, and anti-friction bearings disposed between said dogs and the tool body.

7. A pipe cutter adapted for use in cutting pipes in well bores wherein the cutter tool body is telescoped over the pipe to be cut, said cutter having movable cutting blades, and means to move said blades a predetermined distance for each revolution of the cutter, said means including dogs to engage the junk pipe, and a mandrel having two portions, one portion of which is held in non-rotatable position by said dogs and the other portion of which rotates with the cutters.

8. A pipe cutter adapted for use in cutting pipes in well bores wherein the cutter tool is telescoped over the pipe to be cut, said cutter having movable cutting blades, means to move said blades a predetermined distance for each revolution of the cutter, said means including dogs to engage the junk pipe, a mandrel longitudinally movable with respect to and held in non-rotatable position by said dogs, a wedge-shaped head on said mandrel adapted to rotate with said cutters, and means spacing said dogs and said cutters so that a constant elevation of said cutters with respect to the pipe being cut is maintained.

9. A pipe cutter adapted for use in cutting pipes in well bores wherein the cutter tool is telescoped over the pipe to be cut, said cutter having movable cutting blades, means to move said blades a predetermined distance for each revolution of the cutter, said means including dogs to engage the junk pipe and hold said cutters at a constant elevation, a mandrel longitudinally movable with respect to and held in non-rotatable position by said dogs, a wedge-shaped head on said mandrel adapted to rotate with said cutters, and a threaded connection between said mandrel and the cutter body whereby rotation of the body moves the mandrel longitudinally.

10. In an outside pipe cutter wherein the cutters are adapted to move radially during the cutting operation, a slidable mandrel, a rotatable head on said mandrel, a threaded connection between the slidable portion of said mandrel and the cutter housing whereby the mandrel will move longitudinally upon rotation of the housing to advance the cutters, and means to hold said slidable portion of said mandrel against rotation.

11. An outside pipe cutter including in combination dogs adapted to engage a collar on the pipe being cut, means to force said dogs inwardly, said means arranged to be withdrawn upon rotation of the tool, and additional means to prevent re-arrangement of said means upon reverse rotation of the tool.

12. A pipe cutter having cutting blades adapted to be moved inwardly to cutting position directly in proportion to the amount of rotation of the cutter, including cutting blades and means to engage the pipe being cut, a forked wedge-shaped mandrel disposed so that it will straddle the cutting blades and said means, and means whereby said mandrel engages with the cutter blades to advance them to cutting position.

13. A pipe cutter adapted for use in cutting pipes in well bores wherein the cutter tool is telescoped over the pipe to be cut, said cutter having movable cutting blades, means to move said blades toward the work a predetermined distance for each revolution of the cutter, and means to engage the pipe to be cut whereby the elevation of the cutting blades with respect to the pipe being engaged will be positively fixed.

14. In an outside pipe cutter wherein the cutters are adapted to move radially during the cutting operation, a cutter body, a cutter housing in which said body is pivoted, and a lug on said housing beneath which said cutter body is normally disposed.

15. A pipe cutter adapted for use in cutting pipe in well bores wherein the cutter tool is telescoped over the pipe to be cut, said cutter having movable cutting blades, means to move said blades toward the work a predetermined distance for each revolution of the cutter, and means engageable with the pipe to be cut to fix the elevation of the cutter blades with respect to the pipe being cut and to drive said first means.

In testimony whereof I hereunto affix my signature this 12th day of October A. D. 1929.

DEMPSON H. REED.